W. O. FINK.
CATTLE GUARD.
APPLICATION FILED OCT. 7, 1919.
1,338,006.
Patented Apr. 27, 1920.
2 SHEETS—SHEET 1.
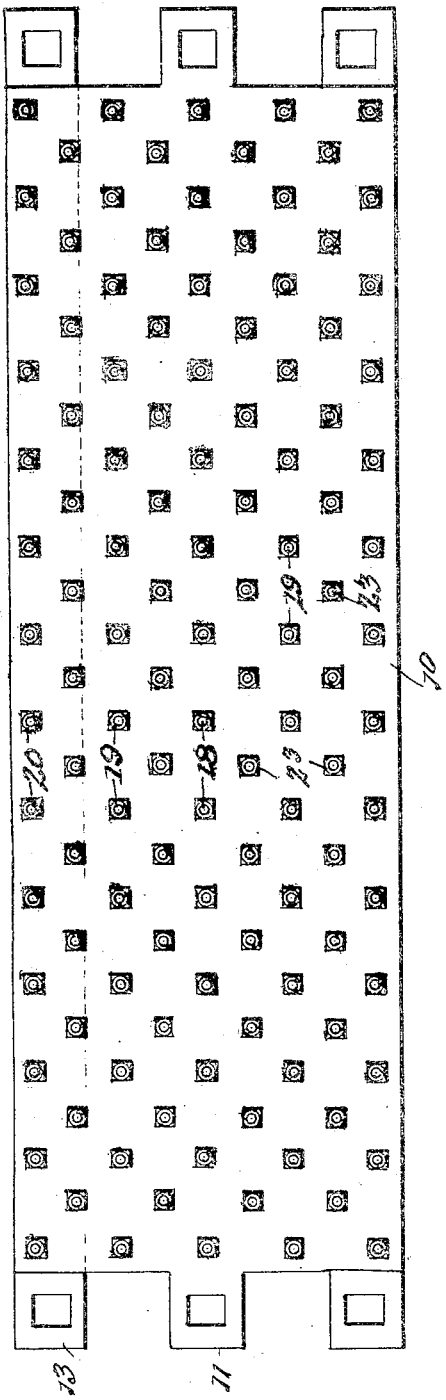
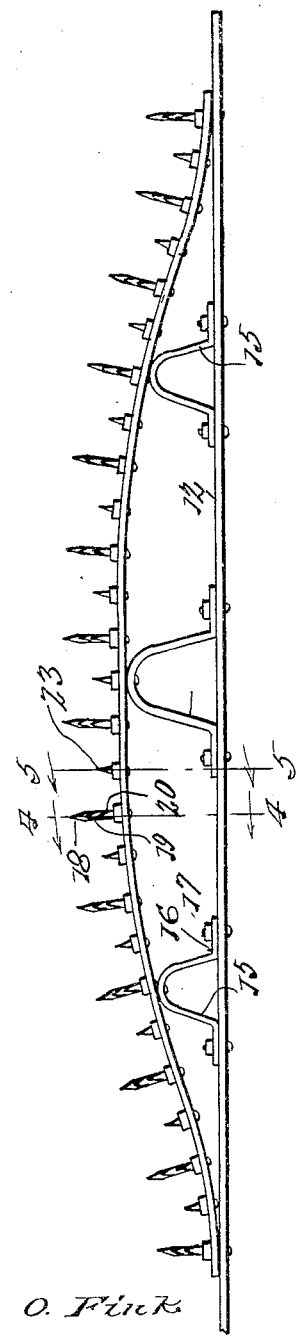
William O. Fink
INVENTOR
BY Richard B. Owen
ATTORNEY

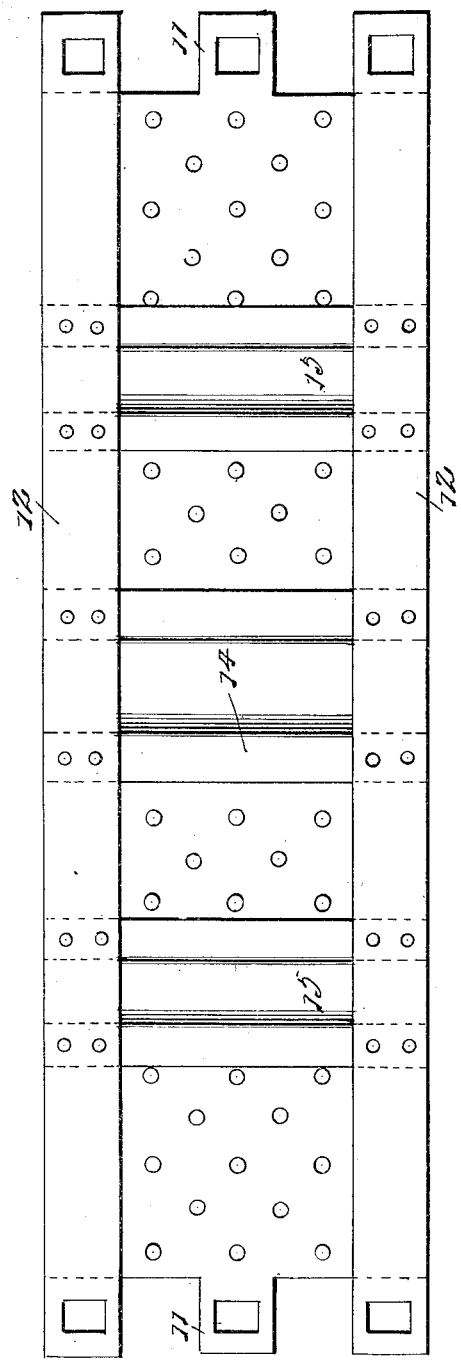
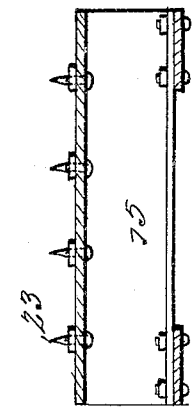
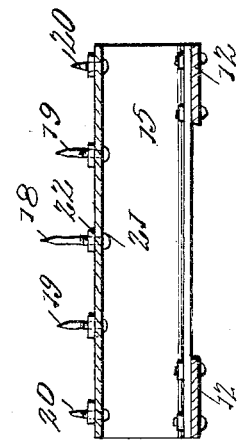

UNITED STATES PATENT OFFICE.

WILLIAM O. FINK, OF SOUTH RANGE, WISCONSIN.

CATTLE-GUARD.

1,338,006.     Specification of Letters Patent.     Patented Apr. 27, 1920.

Application filed October 7, 1919. Serial No. 329,071.

*To all whom it may concern:*

Be it known that I, WILLIAM O. FINK, a citizen of the United States, residing at South Range, in the county of Douglas and State of Wisconsin, have invented certain new and useful Improvements in Cattle-Guards, of which the following is a specification.

This invention has relation to cattle guards and has for an object to provide a device of this kind adapted to be placed between the rails of a railroad track to prevent cattle from traversing the track to gain access from one field to the other.

Another object of the invention is to provide a cattle guard for the purpose above set forth including a plurality of spikes of different height, arranged in a specific manner and eminently adapted for the purpose desired.

In addition to the foregoing, this invention comprehends improvements in the details of construction and arrangement of parts, to be hereinafter described and particularly set forth in the appended claims.

In the accompanying drawings in which similar and corresponding parts are designated by the same characters of reference throughout the several views in which they appear, Figure 1 is a view in top plan of my improved cattle guard.

Fig. 2 is a view thereof in side elevation.

Fig. 3 is a view of a cattle guard in bottom plan.

Figs. 4 and 5 are transverse sections taken on the line 4—4, and 5—5 of Fig. 2.

With reference to the drawings, 10 indicates the top plate which is curved and is provided at each end with integral end extensions 11, slotted to receive spikes whereby the guard may be attached to the tie or any other convenient support. Extending beneath the plate 10 longitudinal thereof are a pair of strips 12 which extend beyond the ends of the plate as at 13 and are slotted to likewise receive spikes to form an additional means of securing the cattle guard in place. The plate 10 is held in an elevated position relatively to the strip 10 by means of braces or supports which includes a transverse central brace 14, and end braces 15, the latter being shorter than the middle brace. Each brace is U-shaped in cross section provided with oppositely extending flanges 16 whereby bolts 17 may be passed therethrough and into the strips 12 to secure the braces in place. The upper portion of the braces may also be secured to the plate 10 if desired.

Mounted upon the plate 10 are a plurality of spikes which are arranged in longitudinal rows and transverse rows in a uniform manner as shown in Fig. 1. The transverse rows are of different characters and will be noted from the section taken on line 4—4 that the spikes adjacent the center of the device as indicated at 18 are longer than those adjacent the edges of the place as indicated at 19 and 20, the spikes 20 being the shortest and 19 of intermediate height. Each spike is formed with a head 21 and is inserted through an opening in the plate, a nut 22 being subsequently applied to the threaded portion of the spikes to secure the same in place. It will be noted by reference to Fig. 5 that at the point where the first section is taken the spikes indicated at 23 are all short and of the same length. These spikes are held in a similar manner to the spikes 18. The two series of short and long spikes are arranged alternately along the plate 10 in transversely extending rows. In this manner, it would be impossible for an animal to obtain a secure foot hold and hence the animal would be deterred in venturing across the plate 10.

While I have illustrated and described my invention with some degree of particularity, I realize that in practice various alterations therein may be made. I therefore reserve the right and privilege of changing the form of the details of construction or otherwise altering the arrangement of the correlated parts without departing from the spirit of the invention or the scope of the appended claims.

Having thus described my invention, what I claim as new and desire to secure by United States Letters Patent is:

1. A cattle guard including a pair of spaced tie spanning strips having spike holes at their respective extremities, a spike-bearing plate disposed upon said strip between the spike holes thereof and braces supported transversely of said strip and beneath said plate, said braces varying in height so as to cause said spiked plate to be curved in an arc between the spike holed end of said strip.

2. A cattle guard including a pair of spaced, tie spanning strips having spike holes at their respective extremities, a spike-bearing plate disposed upon said strip between the spike holes thereof, an extension carried by said plate at its opposite end, each of said extensions having a spike hole therein and being adapted to project forwardly between the strips in alinement with the spike holed ends thereof, and braces supported transversely of said strip in relative spaced relation beneath said plate whereby the latter may be elevated intermediate its ends above said strip to provide a sloping spiked surface for said cattle guard.

3. A cattle guard including a curve plate, strips extending longitudinally thereof, braces interposed between the strip and plate to support the latter in a curved position, and spikes of various length extending from the plate.

4. A cattle guard including a curve plate, means for supporting the same, and a plurality of transversely extending rows of spikes mounted on said plate, one row consisting of short spikes of the same length, and another row of spikes of different length, the longest spike in said series being at the center of the plate and the other spike extending toward the margins thereof in uniform decreasing length.

In testimony whereof I affix my signature in presence of two witnesses.

WILLIAM O. FINK. [L. S.]

Witnesses:
JAMES R. HILE,
C. P. FINK.